US010066950B2

(12) United States Patent
Ettinger et al.

(10) Patent No.: US 10,066,950 B2
(45) Date of Patent: Sep. 4, 2018

(54) ROUTING DEVICE THAT MODIFIES ROUTE GUIDANCE BASED ON USER INPUT

(71) Applicant: UBER TECHNOLOGIES, INC., San Francisco, CA (US)

(72) Inventors: Esther Abramovich Ettinger, Laguna Beach, CA (US); Gil Emanuel Fuchs, Nes Tziona (IL)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/003,831

(22) Filed: Jan. 22, 2016

(65) Prior Publication Data
US 2016/0138927 A1    May 19, 2016

Related U.S. Application Data

(63) Continuation of application No. 14/054,320, filed on Oct. 15, 2013, now Pat. No. 9,243,920.

(60) Provisional application No. 61/716,321, filed on Oct. 19, 2012.

(51) Int. Cl.
*G01C 21/34* (2006.01)
*G01C 21/36* (2006.01)

(52) U.S. Cl.
CPC ......... *G01C 21/3415* (2013.01); *G01C 21/34* (2013.01); *G01C 21/3484* (2013.01); *G01C 21/3641* (2013.01); *G01C 21/3667* (2013.01); *G01C 21/3691* (2013.01)

(58) Field of Classification Search
CPC ............ G01C 21/3641; G01C 21/3655; G01C 21/3664; G01C 21/3667; G01C 21/3694
See application file for complete search history.

(56) References Cited

U.S. PATENT DOCUMENTS

| 4,974,170 | A | 11/1990 | Bouve et al. |
| 5,470,233 | A | 11/1995 | Fruchterman et al. |
| 5,682,525 | A | 10/1997 | Bouve et al. |
| 5,784,059 | A | 7/1998 | Morimoto et al. |
| 6,115,669 | A | 9/2000 | Watanabe et al. |
| 6,339,746 | B1 | 1/2002 | Sugiyama et al. |
| 6,427,118 | B1 | 7/2002 | Suzuki |
| 6,510,379 | B1 | 1/2003 | Hasegawa et al. |
| 6,636,805 | B1 * | 10/2003 | Tada ..................... G01C 21/26 340/990 |

(Continued)

FOREIGN PATENT DOCUMENTS

| WO | WO-2005098362 A1 | 10/2005 |
| WO | WO-2007041547 A1 | 4/2007 |

OTHER PUBLICATIONS

"U.S. Appl. No. 11/785,284, Final Office Action dated Jan. 30, 2014", 13 pgs.

(Continued)

*Primary Examiner* — Kimberly S Berona
*Assistant Examiner* — Anshul Sood
(74) *Attorney, Agent, or Firm* — Schwegman Lundberg & Woessner, P.A.

(57) ABSTRACT

A vehicle routing device that determines a route from an origin to a destination including route guidance. The route guidance is modified based on user input. The modification can supply increased or reduced route guidance at intervals along the route. Route guidance may be modified to incorporate landmarks and personal contacts.

18 Claims, 5 Drawing Sheets

(56) References Cited

U.S. PATENT DOCUMENTS

| | | | |
|---|---|---|---|
| 6,728,635 | B2 | 4/2004 | Hamada et al. |
| 6,820,005 | B2 | 11/2004 | Matsuda et al. |
| 6,944,539 | B2 | 9/2005 | Yamada et al. |
| 7,395,153 | B1 * | 7/2008 | Nesbitt .............. G01C 21/3484 |
| | | | 701/428 |
| 7,463,972 | B2 | 12/2008 | Yamada et al. |
| 7,487,038 | B2 | 2/2009 | Kitagawa et al. |
| 7,487,039 | B2 | 2/2009 | Rumbo et al. |
| 7,532,899 | B2 | 5/2009 | Wilson et al. |
| 7,598,321 | B2 | 10/2009 | Talkowski |
| 7,831,381 | B2 | 11/2010 | Thota |
| 7,933,897 | B2 | 4/2011 | Jones et al. |
| 7,957,871 | B1 | 6/2011 | Echeruo |
| 8,688,367 | B2 | 4/2014 | Mauderer |
| 9,243,920 | B2 | 1/2016 | Ettinger et al. |
| 2001/0007968 | A1 | 7/2001 | Shimazu |
| 2002/0022923 | A1 | 2/2002 | Hirabayashi et al. |
| 2002/0103599 | A1 | 8/2002 | Sugiyama et al. |
| 2002/0120397 | A1 | 8/2002 | Kepler |
| 2004/0167706 | A1 | 8/2004 | Becker |
| 2004/0192311 | A1 | 9/2004 | Koskinen et al. |
| 2004/0205394 | A1 | 10/2004 | Plutowski |
| 2004/0254723 | A1 | 12/2004 | Tu |
| 2005/0065779 | A1 | 3/2005 | Odinak |
| 2005/0227676 | A1 | 10/2005 | De Vries |
| 2005/0256635 | A1 * | 11/2005 | Gardner ................ G01C 21/26 |
| | | | 701/431 |
| 2006/0069503 | A1 | 3/2006 | Suomela et al. |
| 2006/0157621 | A1 | 7/2006 | Santos Rubio et al. |
| 2007/0016368 | A1 | 1/2007 | Chapin et al. |
| 2007/0078596 | A1 | 4/2007 | Grace |
| 2007/0078598 | A1 | 4/2007 | Watanabe et al. |
| 2007/0106469 | A1 | 5/2007 | Ishizaki |
| 2007/0115142 | A1 | 5/2007 | Nakashima |
| 2007/0125967 | A1 | 6/2007 | Lapanik et al. |
| 2007/0143345 | A1 | 6/2007 | Jones et al. |
| 2007/0299607 | A1 | 12/2007 | Cubillo |
| 2008/0109718 | A1 | 5/2008 | Narayanaswami |
| 2008/0140310 | A1 | 6/2008 | Graef |
| 2008/0147319 | A1 | 6/2008 | Cubillo |
| 2008/0195312 | A1 | 8/2008 | Aaron et al. |
| 2008/0262714 | A1 * | 10/2008 | Abramovich Ettinger ................. |
| | | | G01C 21/00 |
| | | | 701/533 |
| 2008/0262717 | A1 | 10/2008 | Ettinger |
| 2008/0319652 | A1 | 12/2008 | Moshfeghi |
| 2008/0319658 | A1 | 12/2008 | Horvitz et al. |
| 2008/0319659 | A1 | 12/2008 | Horvitz et al. |
| 2008/0319660 | A1 | 12/2008 | Horvitz et al. |
| 2009/0005981 | A1 | 1/2009 | Forstall et al. |
| 2009/0222201 | A1 * | 9/2009 | Jung ...................... G01C 21/36 |
| | | | 701/408 |
| 2010/0094536 | A1 | 4/2010 | Lee et al. |
| 2010/0324818 | A1 * | 12/2010 | Gellatly ............. G01C 21/3641 |
| | | | 701/431 |
| 2012/0197690 | A1 | 8/2012 | Agulnek |
| 2014/0358425 | A1 * | 12/2014 | Seth ................... G01C 21/3697 |
| | | | 701/438 |

OTHER PUBLICATIONS

"U.S. Appl. No. 11/785,284, Final Office Action dated Apr. 28, 2011", 6 pgs.
"U.S. Appl. No. 11/785,284, Non Final Office Action dated Jan. 16, 2015", 15 pgs.
"U.S. Appl. No. 11/785,284, Non Final Office Action dated Jun. 28, 2010", 7 pgs.
"U.S. Appl. No. 11/785,284, Non Final Office Action dated Sep. 24, 2009", 8 pgs.
"U.S. Appl. No. 11/785,284, Non Final Office Action dated Oct. 14, 2010", 7 pgs.
"U.S. Appl. No. 11/785,294, Final Office Action dated Feb. 26, 2013", 22 pgs.
"U.S. Appl. No. 11/785,294, Final Office Action dated Mar. 7, 2011", 20 pgs.
"U.S. Appl. No. 11/785,294, Non Final Office Action dated Jun. 21, 2012", 18 pgs.
"U.S. Appl. No. 11/785,294, Non Final Office Action dated Aug. 19, 2010", 12 pgs.
"U.S. Appl. No. 11/785,294, Non Final Office Action dated Dec. 19, 2013", 7 pgs.
"U.S. Appl. No. 14/054,320, Final Office Action dated Feb. 11, 2015", 11 pgs.
"U.S. Appl. No. 14/054,320, Non Final Office Action dated May 29, 2015", 8 pgs.
"U.S. Appl. No. 14/054,320, Non Final Office Action dated Aug. 29, 2014", 9 pgs.
"U.S. Appl. No. 14/054,320, Notice of Allowance dated Sep. 15, 2015", 7 pgs.
"U.S. Appl. No. 14/054,320, Response filed May 6, 2015 to Final Office Action dated Feb. 11, 2015", 15 pgs.
"U.S. Appl. No. 14/054,320, Response filed Aug. 31, 2015 to Non Final Office Action dated May 29, 2015", 16 pgs.
"U.S. Appl. No. 14/054,320, Response filed Nov. 26, 2014 to Non Final Office Action dated Aug. 29, 2014", 15 pgs.
Caduff, David, et al., "The Landmark Spider: Representing Landmark Knowledge for Wayfinding Tasks", American Association for Artificial Intelligence (www.aaai.org), (2002), 1-6.
Ruetschi, Urs-Jakob, et al., "Routing by Landmarks", 6th Swiss Transport Research Conference, Monte Verita / Ascona, (Mar. 15-17, 2006).

* cited by examiner

ROUTING DEVICE THAT MODIFIES ROUTE GUIDANCE BASED ON USER INPUT

CLAIM OF PRIORITY

This application is a continuation of and claims the benefit of priority to U.S. patent application Ser. No. 14/054,320 filed on 2013 Oct. 15 titled "SYSTEM AND METHOD FOR ADAPTING THE ROUTING INFORMATION PROVIDED BY A MAPPING OR ROUTING DEVICE" which in turn claims priority to U.S. Provisional patent application titled "SYSTEM AND METHOD FOR ADAPTING THE ROUTING INFORMATION PROVIDED BY A MAPPING OR ROUTING DEVICE", Application No. 61/716,321, filed 2012 Oct. 19; which application are herein incorporated by reference.

CROSS-REFERENCE TO RELATED APPLICATIONS

This application is related to U.S. patent application titled "DEVICE, SYSTEM AND METHOD OF CONTACT-BASED ROUTING AND GUIDANCE", application Ser. No. 11/785,284, filed Apr. 17, 2007; and U.S. patent application titled "DEVICE, SYSTEM AND METHOD OF LANDMARK-BASED ROUTING AND GUIDANCE", application Ser. No. 11/785,294, filed Apr. 17, 2007, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems for mapping and route guidance, and are particularly related to a system and method for adapting the routing information provided by a mapping or routing device.

BACKGROUND

A typical mapping or routing device (e.g., an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination).

In some instances, the routing information can include a graphical component (e.g., a graphical representation of a suggested driving route displayed in combination with a graphical map), coupled with a textual or audio component (e.g., directions to the user on how to drive in order to reach the destination, such as "Drive north on Broadway for a distance of one mile", "Turn right at the corner of 37th Street", or the like).

However, a problem with current mapping or routing devices is that they generally operate independently of a user's/driver's familiarity with a particular geographical area, and as such are not designed to adapt accordingly. This is the general area that embodiments of the invention are designed to address.

SUMMARY

Described herein is a system and method for adapting the routing information provided by a mapping or routing device. In accordance with an embodiment the system comprises a data collection component (e.g., one or more GPS, accelerometer, or other means of determining location and/or movement), and a route calculation logic that can use information about a first geographical location (origin), and a second geographical location (destination), to calculate a routing information, such as driving directions that a user can follow to drive from the origin to the destination. An information filtering application adapts the amount of information that will be presented to the user at a particular location, moment in time, or based on other criteria. In accordance with an embodiment, the information filtering application can, in some instances, be provided as a third-party application; for example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

DETAILED DESCRIPTION

Figure 1:
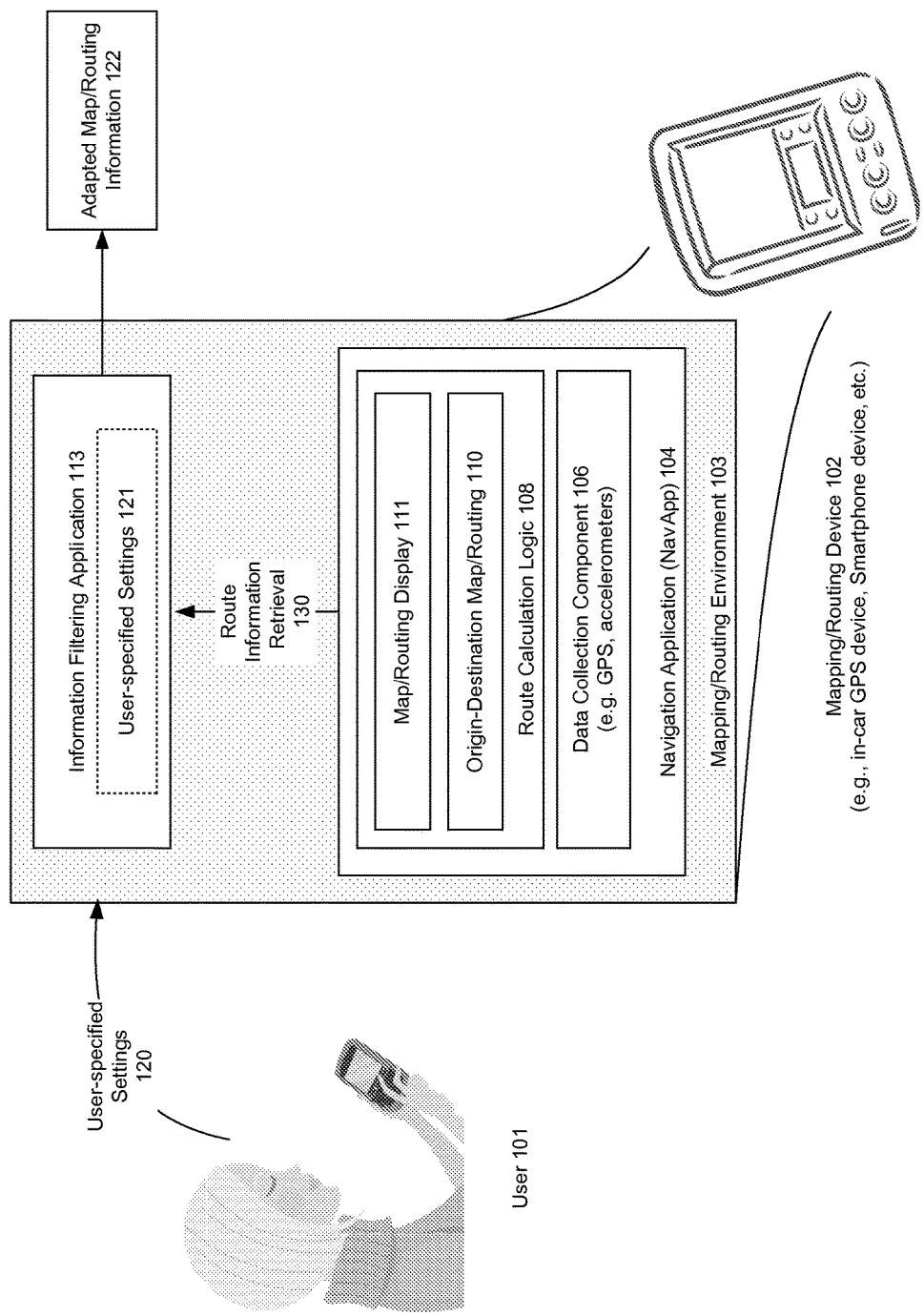
FIG. 1 illustrates a system for adapting the routing information provided by a mapping or routing device, in accordance with an embodiment.

As described above, a typical mapping or routing device (e.g. an in-car global positioning system (GPS), or a handheld smartphone device that includes a mapping software) can be used to display a map of a geographical area selected by a user, and provide routing information, such as driving directions that the user can follow to drive from a first geographical location (origin), to a second geographical location (destination). However, a problem with current mapping or routing devices is that they generally operate independently of a user's/driver's familiarity with a particular geographical area, and as such are not designed to adapt accordingly.

Embodiments of the invention are generally related to systems for mapping and route guidance, and are particularly related to a system and method for adapting the routing information provided by a mapping or routing device. In accordance with an embodiment, the system comprises a data collection component (e.g., one or more GPS, accelerometer, or other means of determining location and/or movement), and a route calculation logic that can use information about the origin and the destination, to calculate a routing information, such as driving directions that a user can follow to drive from the origin to the destination.

In accordance with an embodiment, an information filtering application, which in some instances can be provided as a third-party application, can, based on a user-specified setting, determine the type or how much routing information the system should provide to the user. For example, a "volume" or "slider" type control, or an "expert" software setting, or other means, can be provided to allow the user to instruct the system to provide more or less routing information in appropriate circumstances. Such settings can be manually or directly modified by the user, or can be automatically determined by an external application based on various criteria.

By way of illustration, the settings can be used to instruct the system that routing information be turned off, with no routing information provided; or alternatively that routing information be turned on, with a reduced level of routing information provided; or alternatively that routing information be turned on, with a full level of routing information provided; or another level of adapted map/routing information. Adjusting the level of routing information is akin to adjusting the volume of detail provided to the user, from no detail to all available detail. A special case of the above is for the system to completely turn off the providing of routing information, say for a particular portion of a route, and then to turn on all routing information for another portion of the route.

In accordance with an embodiment, the user-specified settings can specify that the routing information remain at a particular level, e.g., for a particular environment or user. Alternatively, the settings can specify that the routing information should vary for the particular environment or user according to e.g., the user's current location/address when compared to the destination, or the user's lat/long position, or a time value such as when the user is within, e.g., 10 minutes from their destination; or when the user has traveled a particular percentage, e.g., 80% along a particular routing path toward the destination.

When, according to the settings and the determination of the above criteria, the system determines that a reduced level of routing information should be provided, say because the user is familiar with the general location, and is far away from their destination, then, in accordance with an embodiment, the system can provide a reduced level of routing information, or in the special case described above, routing information can be turned off completely for a time period.

Subsequently, when, according to the settings and a determination of the above criteria, the system determines that an increased level of routing information should be provided, say because the user is nearing their destination, then, in accordance with an embodiment, the system can provide a correspondingly increased, or full level of routing information.

Although the above embodiments generally describe that the user/vehicle's current location, time and/or other criteria is used by the route calculation logic to provide an adapted map/routing information, in accordance with various embodiments the route calculation logic can alternatively or additionally use personal contacts information and/or landmark information, such as that described respectively in U.S. patent application titled "DEVICE, SYSTEM AND METHOD OF CONTACT-BASED ROUTING AND GUIDANCE", application Ser. No. 11/785,284, filed Apr. 17, 2007; and U.S. patent application titled "DEVICE, SYSTEM AND METHOD OF LANDMARK-BASED ROUTING AND GUIDANCE", application Ser. No. 11/785,294, filed Apr. 17, 2007, herein incorporated by reference.

FIG. 1 illustrates a system for adapting the routing information provided by a mapping or routing device, in accordance with an embodiment. As shown in FIG. 1, a mapping/routing device 102 can be provided as, e.g., an in-car GPS device, a suitably-equipped smartphone device, or another type of mapping/routing device.

In accordance with an embodiment, the mapping/routing device provides a mapping/routing environment 103, which includes a navigation application (navapp) 104 having a data collection component 106 (e.g., one or more GPS, accelerometers, or other means of determining the location and movement of the user), together with a route calculation logic 108 that can use information about a first geographical location (origin), and a second geographical location (destination), in combination with the data collection component, to calculate a routing information, such as driving directions that the user can follow to drive from the origin to the destination. The route calculation logic can include an origin-destination map routing component 110 that calculates a routing information, such as a map/routing display 111, from the origin to the destination.

In accordance with an embodiment, an information filtering application 113 can be provided to adapt the amount of information that will be presented by the system to the user, including an adapted map/routing display. In accordance with an embodiment, the information filtering application can be provided as a third-party application. For example, in the case of a mapping/routing device incorporated into a smartphone device that includes a mapping software, the information filtering application can be provided as a downloadable or otherwise installable third-party software application that can be installed into the smartphone device and used to adapt the routing information the device provides to a user.

In accordance with an embodiment, a user 101 can specify a setting 120 (such as the use of a "volume" or "slider" type control, or an "expert" software setting), which is used by the information filtering application, to configure 121 and thereafter adapt the amount of map/routing information originally provided 130 by the navapp, and present it instead as adapted map/routing information 122 to the user at a particular location, moment in time, or based on other criteria as described in further detail below.

In accordance with an embodiment, the information filtering application (e.g., third-party application) thereafter adapts the level of routing information provided by the navapp, e.g., by giving the appearance that the navapp has "gone to sleep" and is then woken up at a particular location, as specified by the configuration as, e.g., a latlong, street address, distance from destination, time from destination, or other criteria.

Figure 2:
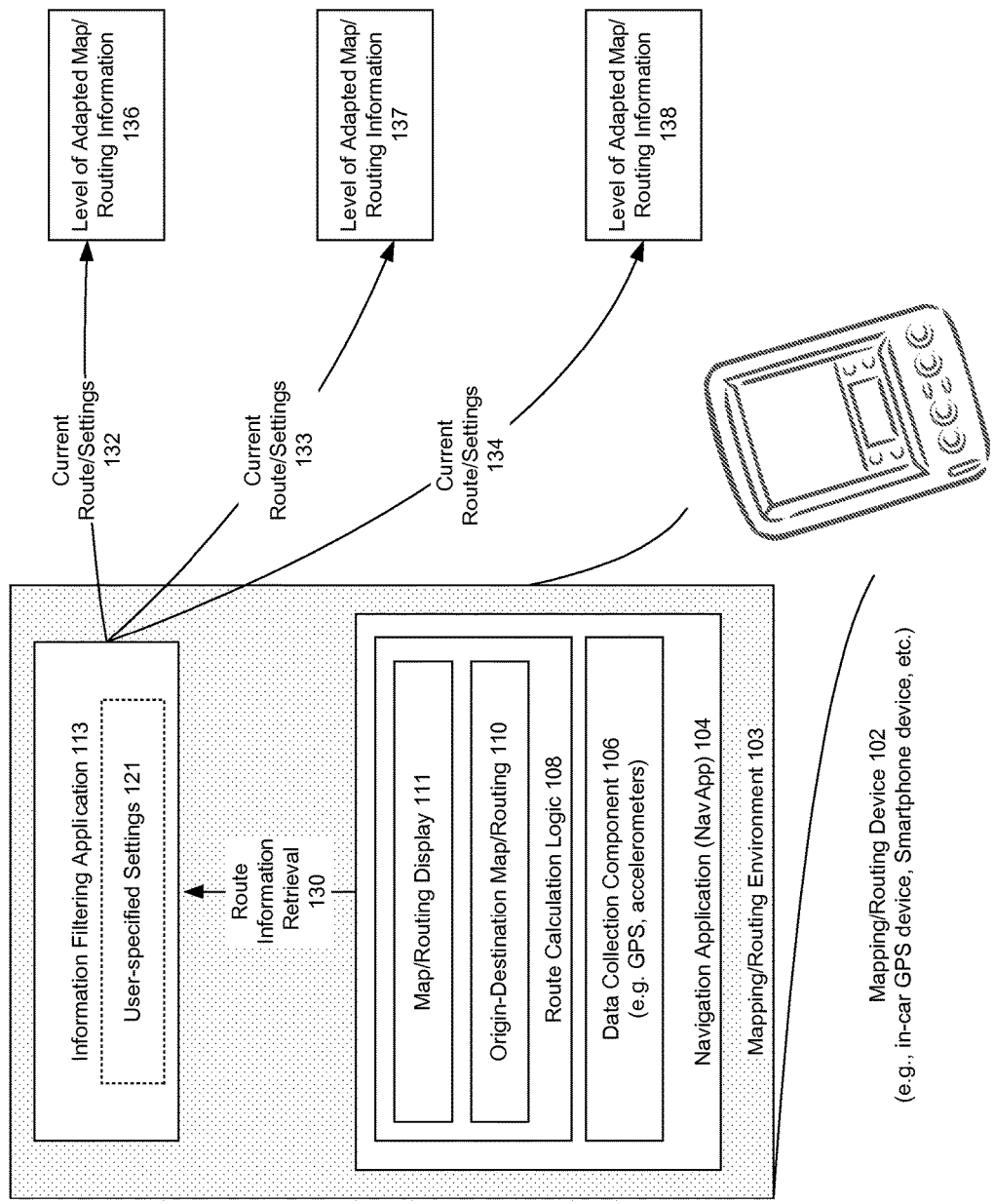
FIG. 2 further illustrates a system for adapting the routing information provided by a mapping or routing device, in accordance with an embodiment.

FIG. 2 further illustrates a system for adapting the routing information provided by a mapping or routing device, in accordance with an embodiment. As shown in FIG. 2, the information filtering application can adapt the amount of map/routing information originally provided by the navapp, and present it instead as different levels of adapted map/routing information 136, 137, 138, to the user at different, e.g., locations or moments in time 132, 133, and 134. In accordance with an embodiment, exceptions can be made for unusual circumstances, e.g., in the event of an unusual traffic situation the level of adapted map/routing information may be temporarily increased.

Figure 3:
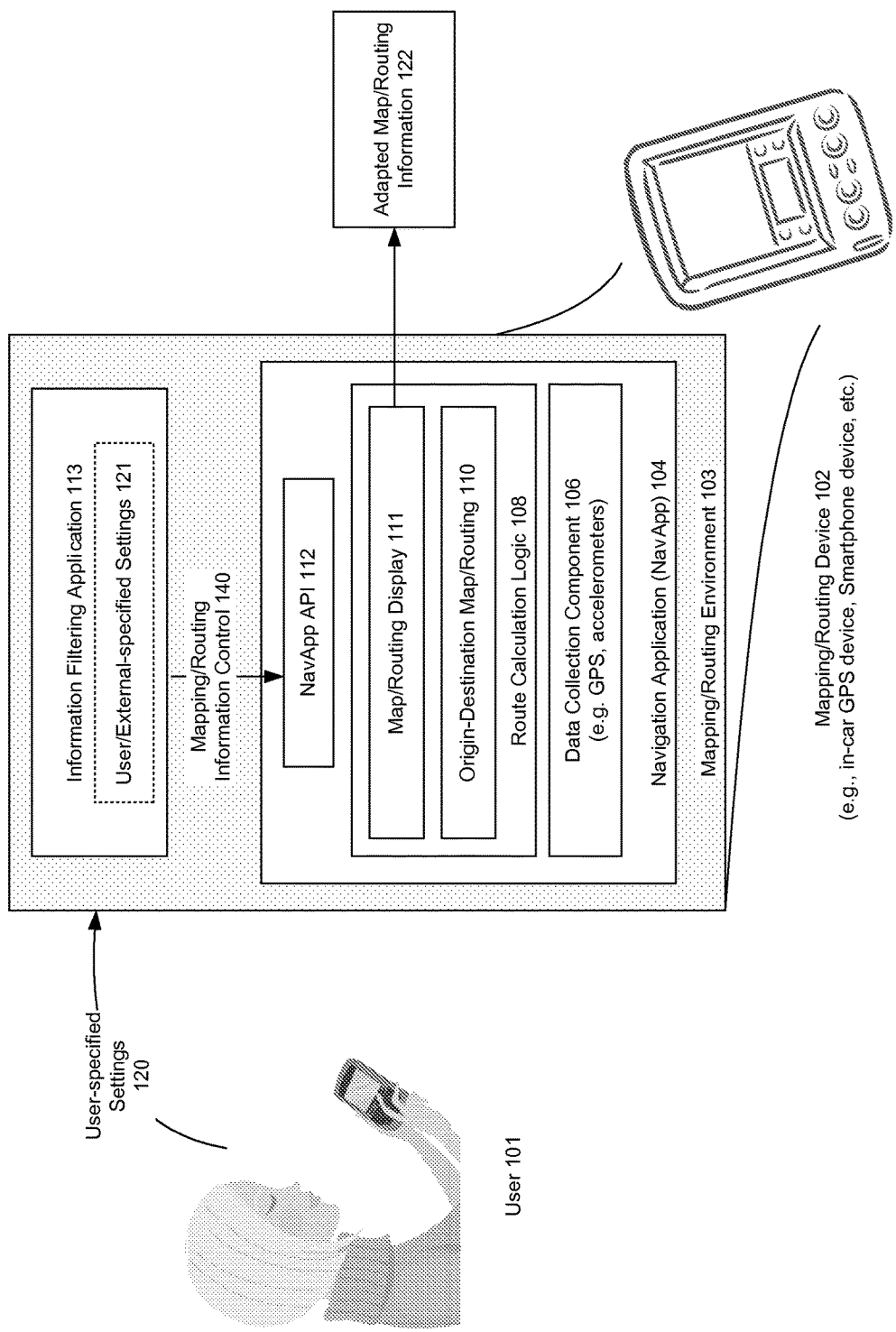
FIG. 3 illustrates a system for adapting the routing information provided by a mapping or routing device, in accordance with another embodiment.

FIG. 3 illustrates a system for adapting the routing information provided by a mapping or routing device, in accordance with another embodiment. As shown in FIG. 3, in accordance with an embodiment, the navapp can include a navapp API 112 that enables access by third-party applications to the navapp. In such embodiments, in addition to the information filtering application operating as above to adapt the amount of map/routing information originally provided by the navapp, the information filtering application can intercept, read, or otherwise access map/routing information 140, and thereafter adapt the amount of information that will be presented by the system to a user.

Figure 4:
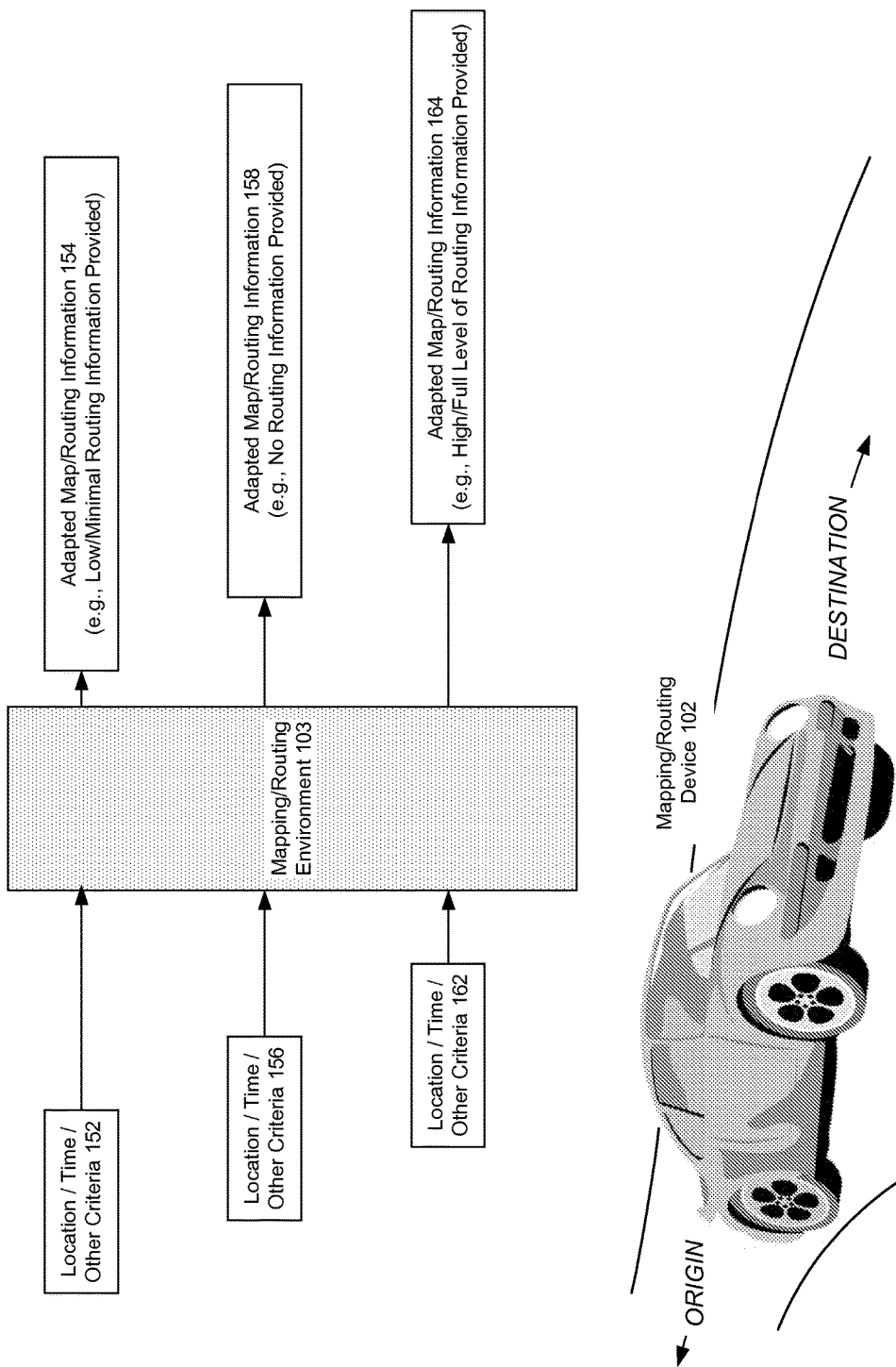
FIG. 4 illustrates the use of a system for adapting the routing information provided by a mapping or routing device, in accordance with an embodiment.

FIG. 4 illustrates the use of a system for adapting the routing information provided by a mapping or routing device, in accordance with an embodiment. As shown in FIG. 4, in accordance with an embodiment, the mapping/routing device can be provided, e.g., as an in-car GPS device for use by a driver in obtaining driving directions from an origin location to a destination location. At a particular location or moment in time 152, or based on other criteria as determined by the information filtering application configuration, the mapping/routing device can provide a particular level of adapted map/routing information 158, such as routing information turned off, with no routing information.

At a subsequent location or moment in time 156, or based on other criteria as determined by the information filtering application configuration, the mapping/routing device can provide a different level of adapted map/routing information 154, such as routing information turned on, with reduced level of routing information.

At a yet subsequent location or moment in time 162, or based on other criteria as determined by the information filtering application configuration, the mapping/routing device can provide a yet different level of adapted map/routing information 164, such as routing information turned on, with full level of routing information, or another level of adapted map/routing information.

Figure 5:
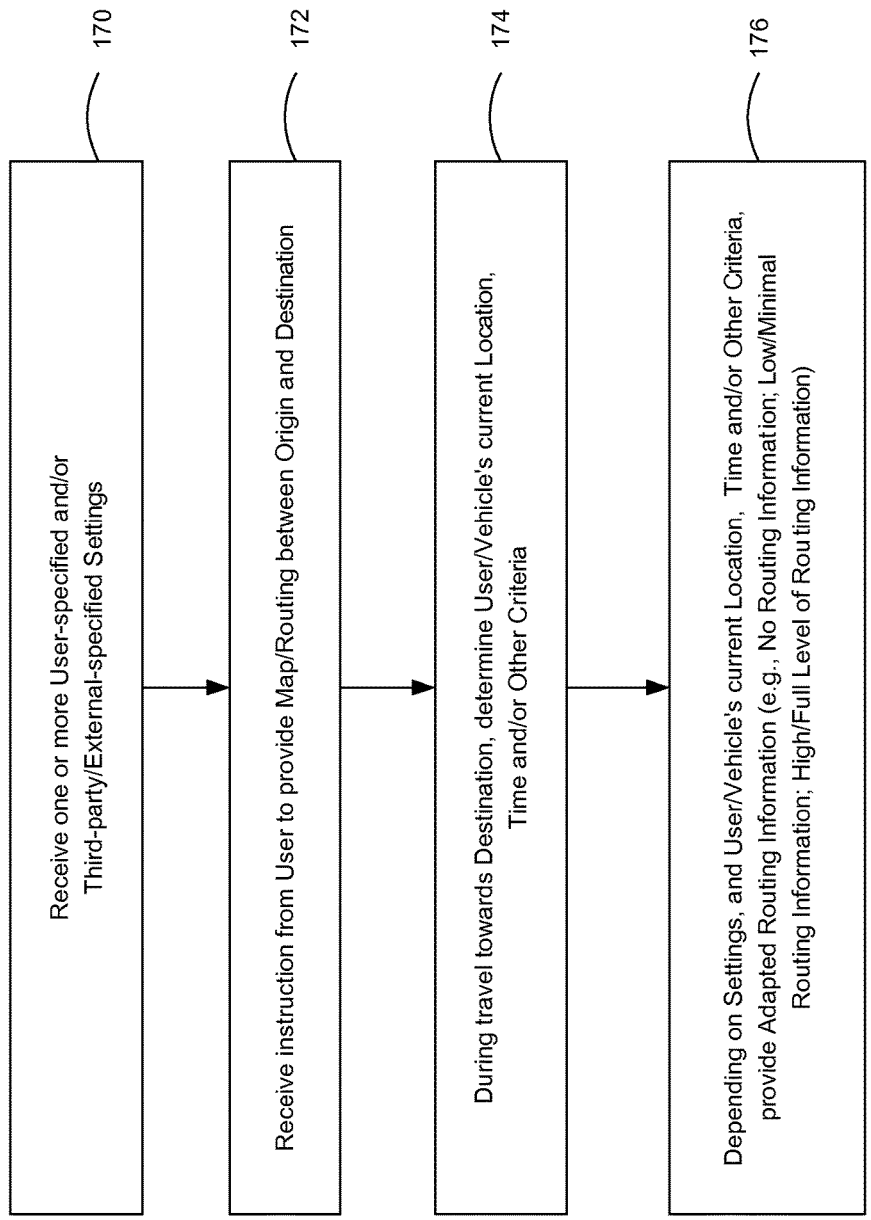
FIG. 5 illustrates a method of adapting the routing information provided by a mapping or routing device, in accordance with an embodiment.

FIG. 5 illustrates a method of adapting the routing information provided by a mapping or routing device, in accordance with an embodiment. As shown in FIG. 5, at step 170, the system receives one or more user-specified and/or third-party and/or external-specified configuration.

At step 172, the system receives an instruction from a user to provide map/routing between a first geographical location (origin), and a second geographical location (destination).

At step 174, during travel towards destination the system determines the user/vehicle's current location, time and/or other criteria.

At step 176, depending on the configuration, and the user/vehicle's current location, time and/or other criteria, the system provides an adapted map/routing information (e.g., routing information turned off, with no routing information; routing information turned on, with reduced level of routing information; routing information turned on, with full level of routing information; or another level of adapted map/routing information).

The present invention may be conveniently implemented using one or more conventional general purpose or specialized digital computers or microprocessors programmed according to the teachings of the present disclosure, or a portable device (e.g., a smartphone, PDA, computer or other device). Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated.

What is claimed:

1. A routing device comprising:
at least one computer processor configured to receive user preferences for routing and routing information; and
at least one computer memory that stores:
a route calculation logic, executable by the at least one computer processor, configured to calculate a route and route guidance from an origin to a destination; and
an information filtering application, executable by the at least one computer processor, configured to perform operations comprising:
determining a location of a user device during travel of the user device between the origin and the destination;
modifying the calculated route guidance based on the received user preferences for routing and routing information, the modifying the calculated route guidance comprising adjusting a level of detail of the calculated route guidance during the travel of the user device between the origin and the destination based on the determined location of the user device; the level of detail of the calculated route guidance being able to be adjusted to a plurality of different detail levels, one of the plurality of detail levels corresponding to presenting some, but not all, of the calculated route guidance;
modifying the calculated route guidance at least in part as a function of a high traffic situation along the calculated route, the modifying including increasing the level of detail of the calculated route guidance based on the high traffic situation along the calculated route; and
transmitting the modified calculated route guidance to the user device for presentation on the user device.

2. The routing device of claim 1, wherein the user device comprises a mobile device that includes a mapping software implemented on the at least one computer processor on the mobile device, and wherein the information filtering application is provided as a downloadable or otherwise installable external software application installed into the computer memory of the mobile device.

3. The routing device of claim 1, wherein the operations further comprise receiving user input prior to or during the travel of the user device between the origin and the destination, wherein the user input comprises a request that selected intervals along the route have one of enhanced or reduced route guidance.

4. The routing device of claim 3, wherein the selected intervals are based on one or more of: starting time of the route, ending time of the route, distance from the start of the route, or distance from the end of the route.

5. The routing device of claim 1, further comprising a database of personal contact and personal landmark information stored in the computer memory wherein the information filtering application is further configured to use the personal contacts and personal landmarks as modified route guidance.

6. The routing device of claim 1, wherein the user device comprises a display device configured to display the route or part of the route on a map and the modified route guidance on the map.

7. The routing device of claim 1, wherein the user device comprises an audio output device configured to verbalize the modified route guidance.

8. The routing device of claim 1, wherein the plurality of detail levels range from no detail of the calculated route guidance to all available detail of the calculated route guidance.

9. A computer-implemented method comprising:
receiving, by a computer system having at least one hardware processor, user preferences for routing and routing information;
calculating, by the computer system, a route and route guidance from an origin to a destination;
determining, by the computer system, a location of a user device during travel of the user device between the origin and the destination;
modifying, by the computer system, the calculated route guidance based on the received user preferences for routing and routing information, the modifying the calculated route guidance comprising adjusting a level of detail of the calculated route guidance during the travel of the user device between the origin and the destination based on the determined location of the user device, the level of detail of the calculated route guidance being able to be adjusted to a plurality of different detail levels, one of the plurality of detail levels corresponding to presenting some, but not all, of the calculated route guidance;
modifying, by the computer system, the calculated route guidance at least in part as a function of a high traffic situation along the calculated route, the modifying including increasing the level of detail of the calculated route guidance based on the high traffic situation along the calculated route; and
transmitting, by the computer system, the modified calculated route guidance to the user device for presentation on the user device.

10. The computer-implemented method of claim 9, wherein the user device comprises a mobile device that includes a mapping software implemented on the at least one computer processor of on the mobile device, and wherein the information filtering application is provided as a downloadable or otherwise installable external software application installed into the computer memory of the mobile device.

11. The computer-implemented method of claim 9, further comprising receiving user input prior to or during the travel of the user device between the origin and the destination, wherein the user input comprises a request that selected intervals along the route have one of enhanced or reduced route guidance.

12. The computer-implemented method of claim 11, wherein the selected intervals are based on one or more of: starting time of the route, ending time of the route, distance from the start of the route, or distance from the end of the route.

13. The computer-implemented method of claim 9, further comprising:
storing a database of personal contact and personal landmark information in a computer memory; and
using the personal contacts and personal landmarks as modified route guidance.

14. The computer-implemented method of claim 9, wherein the user device comprises a display device configured to display the route or part of the route on a map and the modified route guidance on the map.

15. The computer-implemented method of claim 9, wherein the user device comprises an audio output device configured to verbalize the modified route guidance.

16. The computer-implemented method of claim 9, wherein the plurality of detail levels range from no detail of the calculated route guidance to all available detail of the calculated route guidance.

17. A non-transitory computer readable medium having instructions stored thereon which when read and executed by a computer cause the computer to perform operations comprising:
receiving user preferences for routing and routing information;
calculating a route and route guidance from an origin to a destination;
determining a location of a user device during travel of the user device between the origin and the destination;
modifying the calculated route guidance based on the received user preferences for routing and routing information, the modifying the calculated route guidance comprising adjusting a level of detail of the calculated route guidance during the travel of the user device between the origin and the destination based on the determined location of the user device, the level of detail of the calculated route guidance being able to be adjusted to a plurality of different detail levels; one of the plurality of detail levels corresponding to presenting some, but not all, of the calculated route guidance;
modifying the calculated route guidance at least in part as a function of a high traffic situation along the calculated route, the modifying including increasing the level of detail of the calculated route guidance based on the high traffic situation along the calculated route; and
transmitting the modified calculated route guidance to the user device for presentation on the user device.

18. The non-transitory computer readable medium of claim 17, wherein the plurality of detail levels range from no detail of the calculated route guidance to all available detail of the calculated route guidance.

* * * * *

UNITED STATES PATENT AND TRADEMARK OFFICE
CERTIFICATE OF CORRECTION

PATENT NO. : 10,066,950 B2  
APPLICATION NO. : 15/003831  
DATED : September 4, 2018  
INVENTOR(S) : Ettinger et al.

Page 1 of 1

It is certified that error appears in the above-identified patent and that said Letters Patent is hereby corrected as shown below:

In the Claims

In Column 6, Line 48, in Claim 1, delete "device;" and insert --device,-- therefor In Column 8, Line 49, in Claim 17, delete "levels;" and insert --levels,-- therefor Signed and Sealed this  
Fourteenth Day of April, 2020

Andrei Iancu  
*Director of the United States Patent and Trademark Office*